United States Patent [19]
Guido et al.

[11] Patent Number: 5,924,013
[45] Date of Patent: Jul. 13, 1999

[54] METHOD AND APPARATUS FOR TRANSMITTING MOTION PICTURE CINEMATIC INFORMATION FOR VIEWING IN MOVIE THEATERS AND ORDERING METHOD THEREFOR

[76] Inventors: Mary M. Guido, 95 Emerson St., No. 102, Denver, Colo. 80218; Margaret A. Guido, 3275 Harts Run Rd., Glenshaw, Pa. 15116

[21] Appl. No.: 08/922,858

[22] Filed: Sep. 3, 1997

[51] Int. Cl.[6] .................................................... H04H 1/00
[52] U.S. Cl. ............................ 455/3.1; 348/426; 455/4.1
[58] Field of Search .................................. 348/7, 12, 13, 348/459, 445, 722, 723; 455/3.1, 4.1, 4.2; 395/200.47; 345/328

[56] References Cited

U.S. PATENT DOCUMENTS

| | | | |
|---|---|---|---|
| 4,621,443 | 11/1986 | Weinreich | 40/436 |
| 4,866,770 | 9/1989 | Seth-Smith et al. | 380/20 |
| 4,947,244 | 8/1990 | Fenwick et al. | 358/86 |
| 4,974,073 | 11/1990 | Inova | 358/87 |
| 4,974,252 | 11/1990 | Osborne | 379/92 |
| 4,994,909 | 2/1991 | Graves et al. | 358/86 |
| 5,003,384 | 3/1991 | Durden et al. | 358/84 |
| 5,005,950 | 4/1991 | Morin | 350/333 |
| 5,079,544 | 1/1992 | DeMond et al. | 340/701 |
| 5,119,188 | 6/1992 | McCalley et al. | 358/86 |
| 5,130,792 | 7/1992 | Tindell et al. | 358/85 |
| 5,133,079 | 7/1992 | Ballantyne et al. | 455/4.1 |
| 5,140,414 | 8/1992 | Mowry | 358/81 |
| 5,151,782 | 9/1992 | Ferraro | 358/86 |
| 5,239,540 | 8/1993 | Rovira et al. | 370/77 |
| 5,247,347 | 9/1993 | Litteral et al. | 358/85 |
| 5,253,275 | 10/1993 | Yurt et al. | 375/122 |
| 5,291,554 | 3/1994 | Morales | 380/5 |
| 5,329,590 | 7/1994 | Pond | 380/20 |
| 5,351,137 | 9/1994 | Kato et al. | 358/457 |
| 5,361,091 | 11/1994 | Hoarty et al. | 348/7 |
| 5,374,954 | 12/1994 | Mowry | 348/121 |
| 5,386,255 | 1/1995 | Beard et al. | 352/5 |
| 5,440,336 | 8/1995 | Buhro et al. | 348/13 |
| 5,457,493 | 10/1995 | Leddy et al. | 348/164 |
| 5,508,761 | 4/1996 | Saito et al. | 352/26 |
| 5,521,631 | 5/1996 | Budow et al. | 348/7 |
| 5,534,926 | 7/1996 | Ohki et al. | 348/385 |
| 5,550,863 | 8/1996 | Yurt et al. | 375/240 |
| 5,592,188 | 1/1997 | Doherty et al. | 345/84 |
| 5,592,470 | 1/1997 | Rudrapatna et al. | 370/320 |
| 5,633,755 | 5/1997 | Manabe et al. | 359/443 |
| 5,657,036 | 8/1997 | Markandey et al. | 345/85 |
| 5,689,299 | 11/1997 | Isono et al. | 348/7 |
| 5,696,560 | 12/1997 | Songer | 348/436 |
| 5,721,823 | 2/1998 | Chen et al. | 395/200.33 |
| 5,729,279 | 3/1998 | Fuller | 348/8 |
| 5,801,754 | 9/1998 | Ruybal | 348/13 |

OTHER PUBLICATIONS

"POWER Display" Brochure, Digital Projection, Inc., Copyright 1997.

Miniature Satellite Dishes–The New Digital Television, 2nd Edition, Dr. Frank Baylin, Copyright 1995, pp. 1–66, 141–144.

*Primary Examiner*—Victor R. Kostak
*Attorney, Agent, or Firm*—Webb Ziesenheim Logsdon Orkin & Hanson, P.C.

[57] ABSTRACT

Cinematic information including cinemagraphic video images and, optionally, corresponding audio data are converted into a digital format and RF transmitted from a central site to a movie theater. The digital data received at the movie theater is provided to a digital projector which projects sequential frames of cinemagraphic video data onto a screen. The corresponding audio data is converted into audible sounds sequentially with the projection of each frame of cinemagraphic video images. Orders for cinematic information may be placed via a communication network, such as a private or public telephone network.

29 Claims, 3 Drawing Sheets

METHOD AND APPARATUS FOR TRANSMITTING MOTION PICTURE CINEMATIC INFORMATION FOR VIEWING IN MOVIE THEATERS AND ORDERING METHOD THEREFOR

BACKGROUND OF THE INVENTION

1. Field of the Invention

This invention relates to radio frequency transmission of cinematic data from a central location to a movie theater, the projection of the cinematic data at the movie theater and the ordering of select cinematic data from the central site.

2. Description of the Prior Art

Cinematic information corresponding to, for example, movies displayed at movie theaters, is typically embodied on long strips of film, such as Mylar film. For films displayed at movie theaters, the cinematic information includes plural frames of cinemagraphic video images positioned sequentially along the length of the film. Moreover, corresponding audio data may be embodied on an audio track extending lengthwise along the film.

When a movie is first released for distribution to movie theaters, hundreds or thousands of copies of the movie are prepared, where each copy is embodied on one or more rolls of film. The one or more rolls of film comprising each copy of the movie must then be delivered to a select movie theater utilizing a delivery service.

It is both time consuming and expensive to reproduce the hundreds or thousands of copies of a movie, where each copy typically includes one or more rolls of film, and to distribute these copies to movie theaters. Moreover, this time and expense is duplicated for each movie released. Furthermore, when a movie is in declining circulation extra copies of the movie must be removed from circulation and stored, preferably in a temperature and humidity controlled environment, or destroyed. Storing extra copies of movies on film utilized at movie theaters represents an ongoing storage expense while displaying copies represents at least a one time expense.

It is an object of the present invention to overcome the above problems, and others, by providing a system and method for communicating motion picture cinematic information from a central site to a movie theater. It is another object to provide a method for ordering select movies from the central site. Still other objects of the invention will become obvious to those of ordinary skill in the art upon reading the following detailed description.

SUMMARY OF THE INVENTION

Accordingly, we have invented a system for communicating motion picture cinematic information, including cinemagraphic video data and corresponding audio data, from a central site to a motion picture theater. The system includes a first digital storage which stores digital data representing a plurality of sequential frames of cinemagraphic video data and corresponding audio data. A first radio frequency ("RF") transmitter modulates the digital data onto a first RF carrier and transmits the modulated first RF carrier. A first RF receiver receives the modulated first RF carrier and demodulates from the modulated first RF carrier the digital data. A second RF transmitter modulates the digital data onto a second RF carrier and transmits the modulated second RF carrier. A second RF receiver receives a modulated second RF carrier and demodulates from the second RF carrier the digital data. A projector converts the digital data into a plurality of frames of cinemagraphic video data and projects each frame of the cinemagraphic video data to a screen. The corresponding audio data may be converted into audible sound in synchronization with the projection of each frame of cinemagraphic video data.

The system may include a first computer connected to control the operation of the first digital storage and the first RF transmitter. A second digital storage stores the demodulated digital data from the second RF receiver. A second computer is connected to control the operation of the second digital storage and the second RF receiver. Orders for select motion picture cinematic information may be placed from the second computer to the first computer via a communication network, such as a public or private telephone network. The communication network may include an E-mail service provider which receives the orders for the select motion picture cinematic information from the second computer, stores the received orders and communicates the received orders for receipt by the first computer.

The system may include a router which selectively routes the demodulated digital data to a projector or the second digital storage. The projector projects in real time the demodulated digital data and the second digital storage stores the demodulated digital data for delayed projection by the projector. The first computer utilizes a compression algorithm to compress the digital data in advance of modulation onto the first RF carrier. The second computer utilizes the compression algorithm to decompress the demodulated digital data in advance of the projector converting the digital data into the plurality of frames of cinemagraphic video data. For secure transmission of the digital data, the first and second computers may implement a scrambling algorithm which includes a random security code key which is utilized to scramble the digital data in advance of modulation onto the first RF carrier and to unscramble the scrambled digital data in advance of the projector converting the digital data into the plurality of frames of cinemagraphic video data. The random security code key may be generated by the first computer or the second computer and is transmitted to the other of the first computer or the second computer via the communication network. The first and second computers may also utilize a second scrambling algorithm to communicate the random security code key via the communication network. The second RF transmitting means and the second RF receiving means may periodically or aperiodically synchronously change the frequency of the second RF carrier utilized to transmit the digital data therebetween.

The projector may include a plurality of projectors positioned in an array relative to the screen. A multiplexer may be provided for receiving the demodulated digital data and selectively delivering to each of the plurality of projectors a select part of each frame of the cinemagraphic video data. Each of the plurality of projectors projects the select part of each frame provided thereto in synchronization with the other frame parts by the other projectors to form each frame of cinemagraphic video data.

In a method in accordance with the present invention, one of a plurality of movies is ordered from a central site via a communication network. Each of the movies comprises digital data corresponding to a plurality of sequential frames of cinemagraphic video data and may also include corresponding audio data. The digital data is modulated on a first RF carrier which is transmitted. The modulated first RF carrier is received and demodulated to obtain the digital data. The digital data is converted into the plurality of frames of cinemagraphic video data and corresponding audio data. Each frame of cinemagraphic video data is projected onto a screen and any corresponding audio data is converted into audible sounds in synchronization with the projection of each frame of cinemagraphic video data.

The demodulated digital data may be stored for delayed conversion of digital data into the plurality of frames of cinemagraphic video data and corresponding audio data. The digital data may be compressed prior to modulating the digital data on the first RF carrier and the digital data may be decompressed prior to projecting each frame of cinemagraphic video data on the screen.

The projection of each frame of cinemagraphic video data may include the steps of separating a frame of cinemagraphic video data into a plurality of part frames and synchronously projecting the plurality of part frames to the screen with a like plurality of projectors, where the projection of the plurality of frame parts forms the frame of the cinemagraphic video data.

DESCRIPTION OF THE PREFERRED EMBODIMENTS

Figure 1:
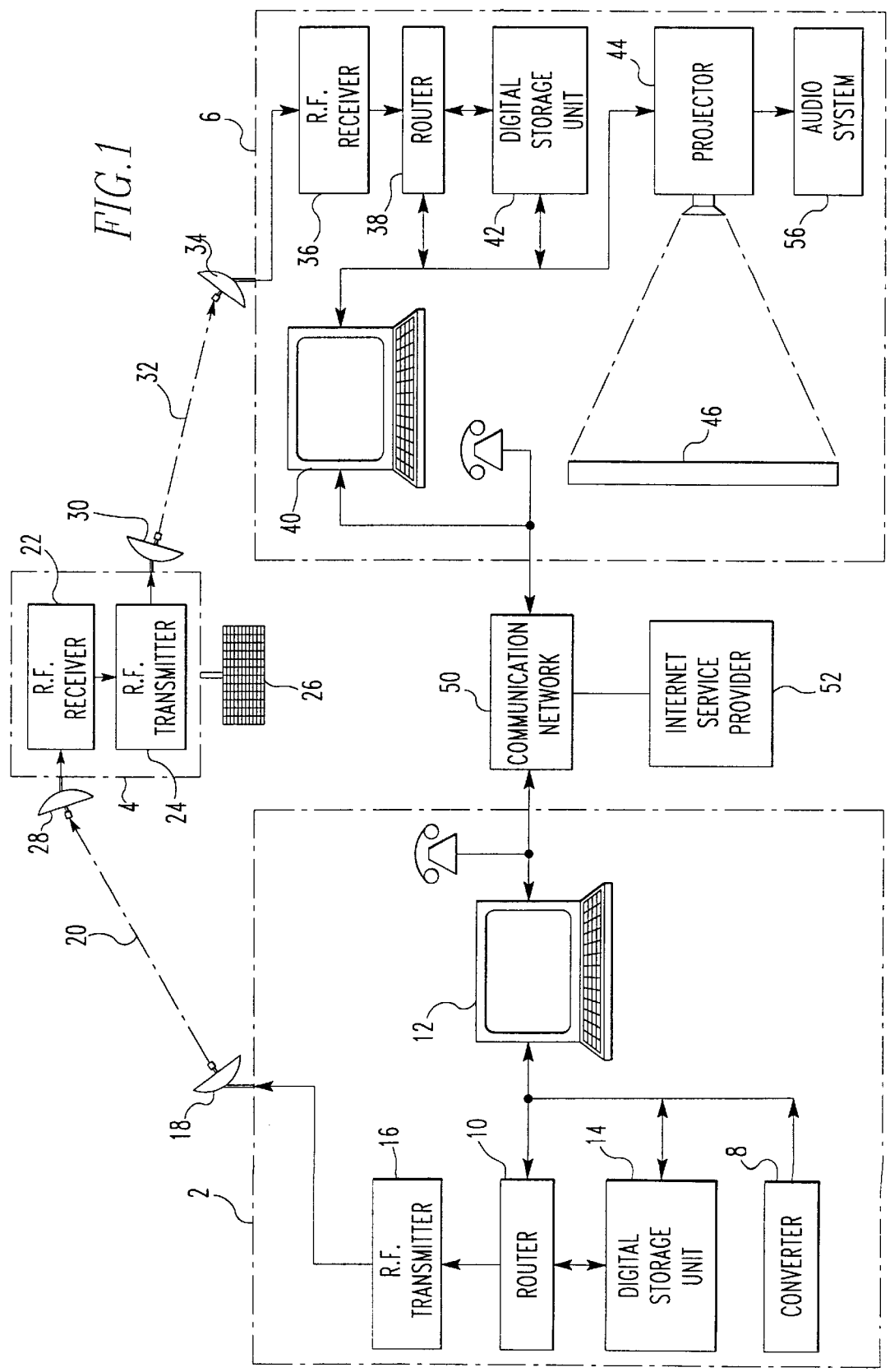
FIG. 1 shows a system for communicating motion picture cinematic information from a central site to a motion picture theater in accordance with the present invention.

With reference to FIG. 1, a system for communicating motion picture cinematic information includes a central site 2, a satellite 4 and one or more movie theaters 6. The central site 2 is utilized as an uplink site for RF communication with the satellite 4. The movie theater 6 is a receiving site for RF signals from the satellite 4.

The satellite 4 may be positioned in geosynchronous orbit over the earth or may be a low earth satellite which periodically traverses a select path around the earth.

The central site 2 includes a converter 8 which converts each frame of a cinemagraphic movie film into a corresponding collection of digital data. Each collection of digital data includes sufficient data for each pixel of a projector, to be discussed hereinafter. The digital data includes color, contrast and hue information necessary for the projector to form a cohesive color correct picture therefrom. The digital data from the converter 8 is provided to a router 10.

The router 10 is controlled by a first computer 12 which causes the router 10 to route the digital signals from the converter to a digital storage unit 14 or a radio frequency ("RF") transmitter 16. The digital storage unit 14 includes control electronics which control the storage of digital data onto storage devices, such as hard drives or optical disks. Alternatively, the first computer 12 causes the router 10 to route digital signals from the converter 8 to the RF transmitter 16. The RF transmitter 16 modulates the digital data onto a first RF carrier signal. The RF transmitter 16 provides the modulated first RF carrier signal to an uplink antenna 18. The uplink antenna 18 converts the modulated first RF carrier signal into a first beam 20 of electromagnetic radiation which is directed to the satellite 4.

The satellite 4 includes an RF receiver 22 and an RF transmitter 24 powerable from an array of photovoltaic cells 26. A receiving antenna 28 is positioned to receive the first beam 20 from the antenna 18. The receiving antenna 28 includes electronics to convert the first beam 20 into an electrical signal which is provided to the RF receiver 22. The RF receiver 22 demodulates the digital data from the first RF carrier signal. The demodulated digital data is provided to the RF transmitter 24 where it is modulated onto a second RF carrier and provided to a transmitting antenna 30. The transmitting antenna 30 includes suitable electronics for converting the modulated second RF carrier into a second beam 32 of electromagnetic radiation which is directed to a downlink antenna 34.

The downlink antenna 34 includes electronics for converting the second beam 32 into corresponding electrical signals which are provided to an RF receiver 36. The RF receiver 36 demodulates the digital data from the second RF carrier and provides the demodulated digital data to a router 38. A second computer 40 connected to the router 38 controls the delivery of the demodulated digital data to a digital storage unit 42 or a projector 44.

The digital storage unit 42, like the digital storage unit 14, includes control electronics which control the storage of the demodulated digital data onto storage devices, such as a hard drive or an optical disk. The second computer 40 may also cause the router 38 to direct the demodulated digital data to the projector 44.

The projector 44 receives the demodulated digital data and arranges the demodulated digital data into a plurality of sequential frames of cinemagraphic video images. The projector 44 converts each frame of demodulated digital data into an image which is projected to a cinemagraphic screen 46, preferably having a horizontal-to-vertical aspect ratio of 16-9, at an appropriate cinematic rate, preferably 24 frames per second. It is believed that projectors 44 suitable for this purpose are commercially available from Digital Projection, Inc. of 55 Chastain Road, Suite 115, Kennesaw, Ga. 30144, USA.

To order a movie, the second computer 40 initiates communication with the first computer 12 at the central site 2 via a communication network 50, preferably a public or private telephone network. The first computer 12 communicates to the second computer 40 a list of available movies. A selection of a desired movie is made at the second computer 40 and communicated to the first computer 12. This selection may include a desired transmission time and information about the receiving movie theater 6 for invoicing purposes.

The second computer 40 may also receive information respecting available movies from central site 2 via an Internet service provider 52. To order one or more movies from the central site 2, each movie theater 6 may order movies from the central site 2 via the Internet service provider 52, thus, avoiding the need to provide plural phone lines at the central site 2 to receive orders from a plurality of movie theaters 6.

For each movie to be transmitted from the central site 2 to the movie theater 6, a unique security code is provided to the second computer 40 which enables decoding of the demodulated digital data into the plurality of digital data comprising the movie. More specifically, the first computer 12 implements a scrambling algorithm that scrambles the digital data in a desired manner prior to modulation by the RF transmitter 16. The scrambling algorithm utilizes a security code key which adapts the sequence of scrambling. The second computer 40 at the movie theater 6 implements an inverse scrambling algorithm to descramble the digital data. To ensure that only ordering movie theaters 6 receive the transmitted movies, the first computer 12 communicates via the public telephone network 50 the security code key to the second computer 40 at the movie theater. Because the same security code key utilized to scramble the digital data is also utilized to descramble the digital data, only second computers 40 having access to both the inverse scrambling algorithm and the security code key can receive the transmission from the central site 2.

To further ensure that only movie theaters 6 ordering movies receive transmissions thereof, different scrambling algorithms and inverse scrambling algorithms may be utilized to transmit movies from the first computer 12 to the second computer 40. To this end, the different inverse scrambling algorithms and security code keys may be communicated from the first computer 12 to the second computer 40 via the communication network 50.

To enhance the efficiency of transmission of the digital data, the first computer 12 may implement a compression algorithm, such as JPEG or MPEG, on the digital data to compress the digital data in advance of modulation onto the first RF carrier. The second computer 40 at the movie theater 6 implements the inverse compression algorithm to decompress the demodulated digital data in advance of the projector converting the digital data into the plurality of frames of cinemagraphic video images.

For further security of transmission of digital data between the central site 2 and the movie theater 6, the first and second computers 12, 40 utilize a second scrambling algorithm to communicate the random security code key or the inverse scrambling algorithm via the communication network 50. Moreover, the RF transmitter 24 of the satellite 4 and the RF receiver 36 of the movie theater 6 may synchronously change the frequency of the second RF carrier 32, i.e., frequency rotation.

Figure 2:
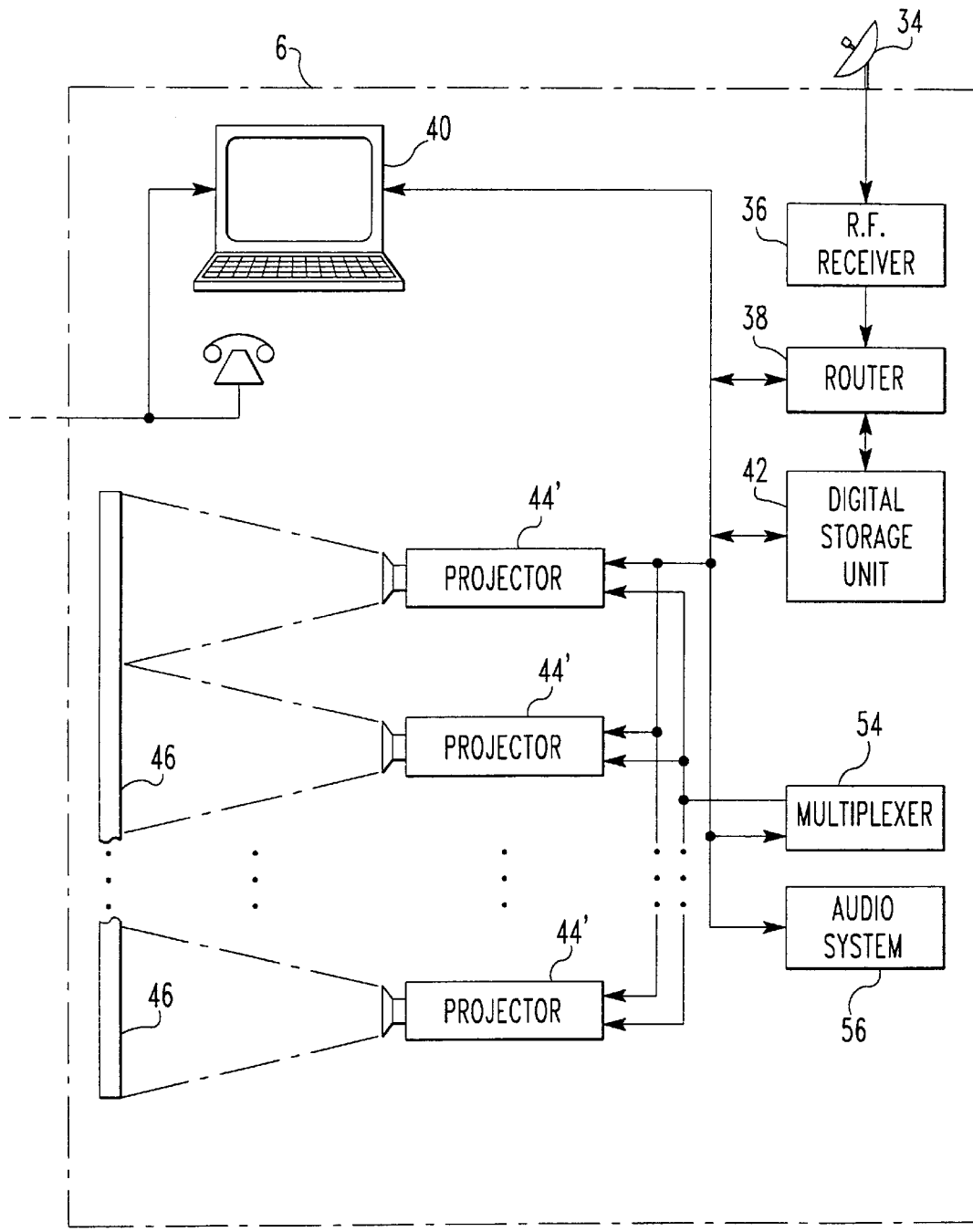
FIG. 2 shows an alternate embodiment of the movie theater of FIG. 1.

With reference to FIG. 2 and with continuing reference to FIG. 1, the movie theater 6 may include a plurality of projectors 44' positioned in an array relative to the screen 46. The plurality of projectors 44' are positioned so that each projector 44' projects a select part of each frame of a cinemagraphic video image onto a select part of the screen 46. The array of projectors 44' are connected to a multiplexer 54 which is connected to the second computer 40 and the router 38. The multiplexer 54, under the control of a controller, e.g., the second computer 40, receives the demodulated digital data from the router 38 and selectively delivers to each of the plurality of projectors 44' a select part of each frame of cinemagraphic video data. If transmitted in real time, the RF receiver 36 provides the demodulated digital data to the multiplexer 54 via the router 38. If the demodulated digital data is stored in the digital storage unit 42, the multiplexer 54 receives the demodulated digital data from the digital storage unit 42 via the router 38. Under the control of the second computer 40, the array of projectors 44' synchronously project to the screen 46 each frame of the cinemagraphic video images.

The demodulated digital data may include digital audio data corresponding to the cinemagraphic video images. The digital audio data is converted to analog audio signals which is provided to an audio system 56 in synchronization with the projection of sequential frames of cinemagraphic video data to the screen 46.

With reference back to FIG. 1, at an appropriate time, the motion picture cinematic information, including the cinemagraphic video images and corresponding audio data, is transmitted from the central site to the motion picture theater 6. More specifically, the converter 8 converts each frame of motion picture cinematic information contained on a film into digital data which is provided to the router 10.

Alternatively, each frame of motion picture cinematic information is converted to digital form and stored in the digital storage unit 14 which provides the digital data to router 10. In certain cases, it may not be necessary to include the converter 8 in the system according to the present invention, such as where the cinematic information is already in digital form. The router 10 provides the digital data to the RF transmitter 16 which modulates the digital data onto the first RF carrier. The modulated first RF carrier is provided to the uplink antenna 18 for transmission to the satellite 4. The receiving antenna 28 of the satellite 4 provides to the RF receiver 22 the received modulated first RF carrier. The RF receiver 22 demodulates the digital data from the first RF carrier and provides the digital data to the RF transmitter 24 which modulates the digital data onto a second RF carrier which is provided to the transmitting antenna 30. The downlink antenna 34 provides the received modulated second RF carrier to RF receiver 36. The use of a first RF carrier frequency to uplink data and a second RF carrier to downlink data avoids destructive interference therebetween.

The RF receiver 36 demodulates from the second RF carrier the digital data which is provided to the router 38. To display the motion picture cinematic information in substantially real time, the router 38 routes the demodulated digital data to the projector 44 for conversion into cinemagraphic video images. Synchronous with the conversion of the demodulated digital data into cinemagraphic video data, the digital audio data is provided to the audio system 56 for conversion into audible sounds. Alternatively, the digital data may be routed to the digital storage unit 42. The digital data stored in the digital storage unit 42, under the control of the second computer 40, can be provided to the projector 44 at a later selected time. Hence, the motion picture cinematic information transmitted from the central site 2 to the movie theater 6 can be displayed in substantially real time or can be stored for delayed projection.

The projector 44 can be utilized to front project or rear project the frames of cinemagraphic video images onto the screen 46. Preferably, the frames of cinemagraphic video images rear projected onto the screen by projector 44 are imaged reversed so that a picture viewed by a viewer viewing a front projected image or a rear projected image have the same left-right orientation. This may be particularly important where the corresponding audio data contains left-right encoding information that is synchronized to a desired left-right orientation of the movie.

Figure 3:
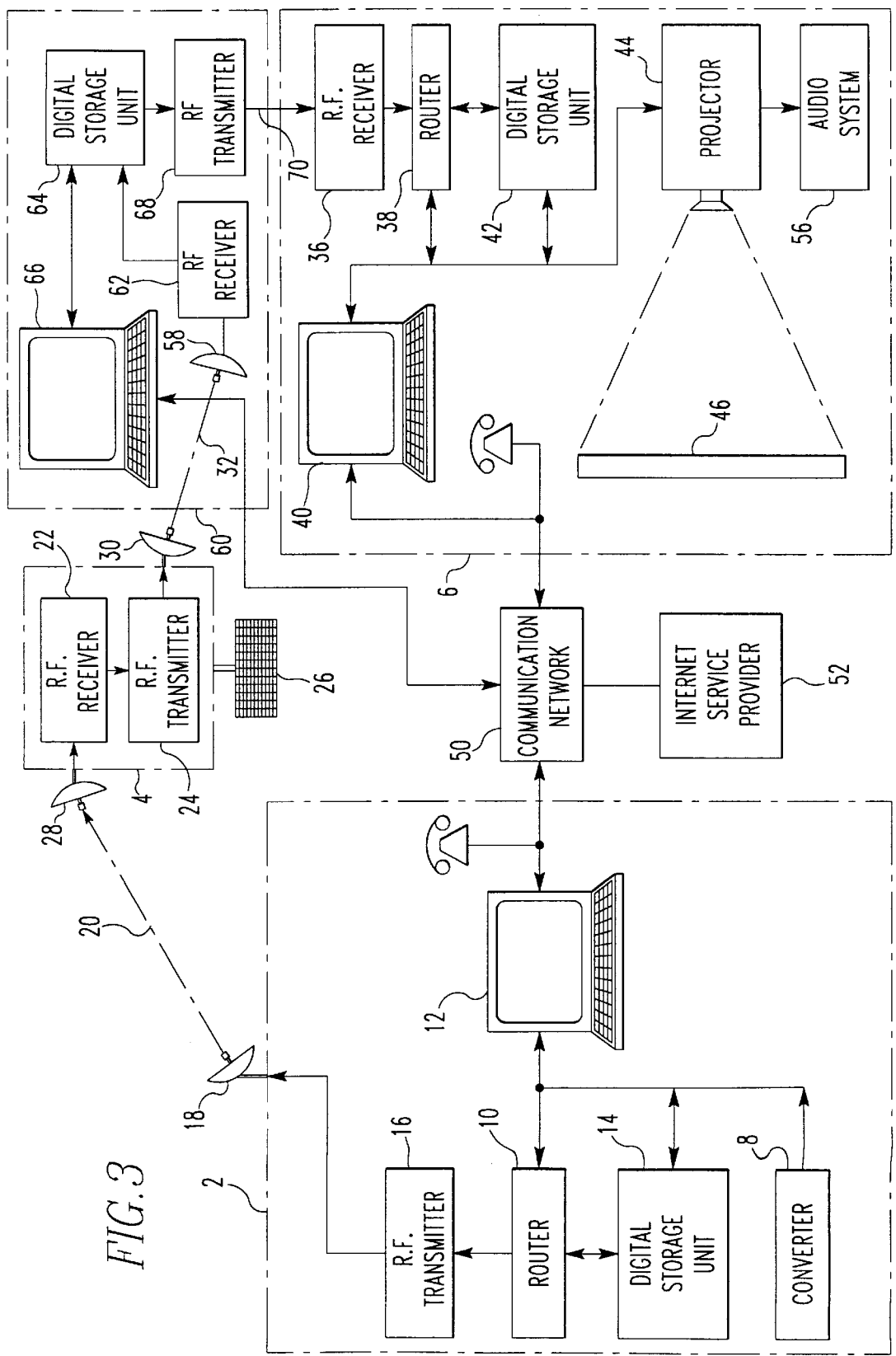
FIG. 3 shows an alternate embodiment of the system of FIG. 1.

With reference to FIG. 3, in another embodiment, the second beam 32 of electromagnetic radiation is received by a downlink antenna 58 which, in this embodiment, is positioned at a site 60 remote from the movie theater 6. The remote site 60 is preferably a cable service provider. The remote site 60 includes an RF receiver 62 and a digital storage unit 64. The RF receiver 62 demodulates the digital data from the second RF carrier 32 and provides the demodulated digital data to the digital storage unit 64. At an appropriate time coordinated between the second computer 40 and a third computer 66, the demodulated digital data is provided to an RF transmitter 68 which modulates the digital data for transmission over a cable network 70 and provides the modulated digital data to the RF receiver 36 via the cable network 70. Like the embodiment described in connection with FIG. 1, the RF receiver 36 demodulates the digital data from the cable network 70 and provides the demodulated digital data to the router 38. The second computer 40 connected to the router 38 controls the delivery of the demodulated digital data to the digital storage unit 42 or the projector 44.

The above invention has been described with reference to the preferred embodiments. Obvious modifications, combinations and alterations will occur to others upon reading the preceding detailed description. For example, the motion picture cinematic information may be transmitted from the central site 2 to the movie theater 6 directly from the uplink antenna 18 to the downlink antenna 34. This direct communication between antennas 18 and 34 avoids remodulation of the digital data comprising the motion picture cinematic information from the first RF carrier at a first frequency to the second RF carrier at the second frequency. Such direct transmission, however, may be limited to line-of-sight transmission. It is intended that the invention be construed as including all such modifications and alterations insofar as they come within the scope of the appended claims or the equivalents thereof.

We claim:

1. A system for communicating motion picture cinematic information that includes cinemagraphic video images and corresponding audio data from a central site to a movie theater, the system comprising:

a first RF transmitter which receives digital data representing a plurality of sequential frames of cinemagraphic video images, modulates the digital data onto a first RF carrier and transmits the modulated first RF carrier;

a first RF receiver which receives the modulated first RF carrier and which demodulates therefrom the digital data;

a second RF transmitter which receives the digital data from the first RF receiver, modulates the digital data onto a second RF carrier and transmits the modulated second RF carrier;

a second RF receiver which receives the modulated second RF carrier and demodulates therefrom the digital data; and a projector which receives the digital data from the second RF receiver converts the digital data into the plurality of frames of cinemagraphic video images and projects each frame of the cinemagraphic video images to a screen.

2. The system as set forth in claim 1, further including:

a first computer connected to a first digital storage which stores the digital data for modulation onto the first RF carrier;

a second digital storage which stores the demodulated digital data from the second RF receiver; and a second computer connected to the second digital storage for controlling the operations thereof.

3. The system as set forth in claim 2, wherein the second computer communicates electronically to the first computer via a communication network an order for a select motion picture which includes the digital data reresenting the plurality of sequential frames of cinemagraphic video images.

4. The system as set forth in claim 1, further including a router which selectively routes the demodulated digital data from the second RF receiver to at least one of (i) the projector which projects in substantially real-time the demodulated digital data and (ii) digital storage which stores the demodulated digital data from the second RF receiver for delayed projection by the projector.

5. The system as set forth in claim 4, further including a second computer which selectively causes the router means to route the signals to at least one of the projector and the second digital storage.

6. The system as set forth in claim 2, wherein:

the first computer utilizes a compression algorithm to compress the digital data in advance of modulation onto the first RF carrier; and the second computer utilizes the compression algorithm to decompress the demodulated digital data in advance of the projector converting the digital data into the plurality of frames of cinemagraphic video images.

7. The system as set forth in claim 3, wherein:

the first computer implements a first scrambling algorithm;

the second computer implements a first inverse scrambling algorithm;

one of the first computer and the second computer generates a random security code key which is utilized by the first scrambling algorithm to scramble the digital data and which is utilized by the first inverse scrambling algorithm to un-scramble the scrambled digital data; and the random security code key generated by one of the first computer and the second computer is transmitted to the other of the first computer and the second computer via the communication network.

8. The system as set forth in claim 7, wherein the first and second computers utilize a second scrambling algorithm to communicate the random security code key via the communication network.

9. The system as set forth in claim 1, wherein the second RF transmitting means and the second RF receiving means synchronously change the frequency of the second RF carrier utilized to transmit the digital data.

10. The system as set forth in claim 1, wherein the plurality of frames of cinemagraphic video images are projected to the screen at a cinemagraphic rate.

11. The system as set forth in claim 1, wherein the projector projects each frame of the cinemagraphic video data to the screen in one of a front projection mode and a rear projection mode.

12. The system as set forth in claim 1, further including:

a plurality of projectors positioned in an array relative to the screen;

a multiplexer which receives the demodulated digital data and which selectively provides each projector with a select part of a frame of the cinemagraphic video data; and a controller which causes the plurality of projectors to project in synchronization the frame of cinemagraphic video data.

13. The system as set forth in claim 3, wherein the communication network includes an Internet service provider which receives orders for a select motion picture from the second computer, stores the received orders and transmits the received orders for receipt by the first computer.

14. The system as set forth in claim 1, wherein:

the digital data includes audio data corresponding to the frames of cinemagraphic video images; and the audio data is converted into audible sounds in synchronization with the projection of each frame of the cinemagraphic video images to the screen.

15. A method of communicating motion picture cinematic information from a remote site to one of a plurality of motion picture theaters, the method comprising:

(a) ordering from a central site via a communication network one of a plurality of movies, each of the plurality of movies comprising digital data corresponding to a plurality of sequential frames of cinemagraphic video images;

(b) at the central site, modulating the digital data on a first RF carrier;

(c) transmitting the modulated first RP carrier;

(d) receiving the modulated first RF carrier at one of a plurality of motion picture theaters;

(e) demodulating from the modulated first RF carrier the digital data;

(f) converting the digital data into the plurality of frames of cinemagraphic video images; and (g) projecting each frame of cinemagraphic video images onto a screen.

16. The method as set forth in claim 15, wherein the steps e through g are performed in real-time.

17. The method as set forth in claim 15, further including the steps of:

storing at the one of the plurality of motion picture theaters the demodulated digital data; and delaying the conversion of digital data into the plurality of frames of cinemagraphic video images.

18. The method as set forth in claim 15, further including, between step (e) and step (f), the steps of:

modulating the digital data onto a second RF carrier;

transmitting the modulated second RF carrier;

receiving the modulated second RF carrier; and demodulating from the modulated second RF carrier the digital data.

19. The method as set forth in claim 15, further including the steps of:

compressing the digital data prior to modulating the digital data on the first RF carrier; and decompressing the digital data prior to projecting each frame of cinemagraphic video images on the screen.

20. The method as set forth in claim 15, wherein the step of projecting each frame of cinemagraphic video images including the steps of:

separating a frame of a cinemagraphic video image into a plurality of part frames; and synchronously projecting the plurality of part frames to the screen to form on the screen the frame of the cinemagraphic video image.

21. The method as set forth in claim 15, wherein:

the digital data includes audio data corresponding to the plurality of sequential frames of cinemagraphic video images; and the audio data is converted into audible sounds in synchronization with a projection of each frame of cinemagraphic video images.

22. A motion picture cinematic communication system comprising:

a RF receiver which receives a modulated RF carrier having digital data representing a plurality of sequential frames of cinemagraphic video images and corresponding audio data modulated thereon and which demodulates therefrom the digital data; and a projector which converts the digital data into the plurality of frames of cinemagraphic video data and which projects each frame of the cinemagraphic video data to a screen, wherein the audio data is converted into audible sound in synchronization with the projection of each frame of cinemagraphic video images to the screen.

23. A method of providing to a motion picture theater motion picture cinematic information that includes cinemagraphic video images, the method comprising the steps of:

(a) modulating digital data corresponding to cinemagraphic video images comprising a movie;

(b) transmitting the modulated digital data;

(c) receiving the modulated digital data;

(d) demodulating the received modulated digital data to obtain the digital data;

(e) converting the digital data into the cinemagraphic video images; and (f) projecting the cinemagraphic video images onto a screen.

24. The method as set forth in claim 23, further including before step (a) the step of converting the cinemagraphic video images into corresponding digital data.

25. The method as set forth in claim 23, wherein the modulated digital data is transmitted over at least one of a fiber optic cable and a coaxial cable.

26. The method as set forth in claim 23, wherein:

the motion picture cinematic information includes corresponding audio data;

the modulated digital data includes the corresponding audio data;

step (e) further includes the step of converting the digital data into the corresponding audio data; and step (f) further includes the step of converting the corresponding audio data into audible sounds in synchronization with the projection of each frame of cinemagraphic video images onto the screen.

27. A method of providing to a motion picture theater motion picture cinematic information that includes cinemagraphic video images, the method comprising the steps of:

(a) converting electronic digital data corresponding to cinemagraphic video images into optical digital data;

(b) transmitting the optical digital data to the motion picture theater via a fiber optic cable;

(c) receiving the optical digital data;

(d) converting the received optical digital data into the electronic digital data;

(e) converting the electronic digital data into optical cinemagraphic video images; and (f) projecting the optical cinemagraphic video images to a screen.

28. The method as set forth in claim 27, further comprising the steps of:

modulating at least one of the electronic digital data and the optical digital data;

transmitting the modulated at least one of the electronic digital data and the optical digital data;

receiving the modulated at least one of the electronic digital data and the optical digital data; and demodulating the at least one of the electronic digital data and the optical digital data.

29. The method as set forth in claim 27, wherein:

step (a) includes converting electronic digital data corresponding to audio data into the optical digital data, with the audio data corresponding to the cinemagraphic video images;

step (e) includes converting the electronic digital data into the audio data; and step (f) includes converting the audio data into audible sounds in synchronization with the projection of the optical cinemagraphic video images to the screen.

* * * * *

UNITED STATES PATENT AND TRADEMARK OFFICE
CERTIFICATE OF CORRECTION

PATENT NO. : 5,924,013
DATED : July 13, 1999
INVENTOR(S) : Mary M. Guido and Margaret A. Guido It is certified that error appears in the above-identified patent and that said Letters Patent is hereby corrected as shown below:

Column 7 Line 65 Claim 5 after "router" delete --means--.

Column 9 Line 3 Claim 15, paragraph (c), "RP" should read --RF--.

Signed and Sealed this

Eleventh Day of January, 2000

Attest:

Q. TODD DICKINSON

*Attesting Officer*   *Acting Commissioner of Patents and Trademarks*